(12) United States Patent
Muresan et al.

(10) Patent No.: US 7,752,483 B1
(45) Date of Patent: Jul. 6, 2010

(54) PROCESS AND SYSTEM FOR THREE-DIMENSIONAL URBAN MODELING

(75) Inventors: David Darian Muresan, Arlington, VA (US); Andrew Charles Weitz, Redlands, CA (US)

(73) Assignee: Science Applications International Corporation, San Diego, CA (US)

( * ) Notice: Subject to any disclaimer, the term of this patent is extended or adjusted under 35 U.S.C. 154(b) by 874 days.

(21) Appl. No.: 11/637,783

(22) Filed: Dec. 13, 2006

(51) Int. Cl.
*G01V 3/38* (2006.01)

(52) U.S. Cl. .................. 713/601; 713/400; 713/600; 702/5; 386/66

(58) Field of Classification Search ............. 713/400, 713/600, 601; 702/5; 386/66
See application file for complete search history.

(56) References Cited

U.S. PATENT DOCUMENTS

| | | | | |
|---|---|---|---|---|
| 4,439,788 A | 3/1984 | Frame | | 348/262 |
| 6,741,790 B1 | 5/2004 | Burgess | | 386/46 |
| 6,904,160 B2 | 6/2005 | Burgess | | 382/113 |
| 6,937,270 B1 | 8/2005 | Dong et al. | | 348/159 |
| 7,366,939 B2 * | 4/2008 | Le et al. | | 713/400 |
| 2004/0066329 A1 * | 4/2004 | Zeitfuss et al. | | 342/357.07 |
| 2007/0070069 A1 * | 3/2007 | Samarasekera et al. | | 345/427 |

* cited by examiner

*Primary Examiner*—Mark Connolly
(74) *Attorney, Agent, or Firm*—King & Spalding LLP

(57) ABSTRACT

A Heart Beat System (HBS) enables both inertial navigation system (INS) technology and other sensors, e.g., laser radar (LIDAR) systems, cameras and the like to be precisely time-coupled. The result of this coupling enables microsecond control by the HBS to each sensor slave component. This synchronization enables the precise time of each sensor measurement to be known which in turn allows highly accurate world coordinates to be computed from each set of received date, e.g., laser pulses range data. Such precision results in 3-dimensional point cloud data with relative accuracies in the 5-10 cm range and absolute positioning accuracies in the sub 40 cm range. This precision further enables multiple sensors to be used simultaneously with outstanding registration which leads to fused 3D point cloud databases representing a more comprehensive urban scene. Finally, 3D data collected from subsequent missions can be used for precision change detection analysis.

26 Claims, 6 Drawing Sheets

50

PROCESS AND SYSTEM FOR THREE-DIMENSIONAL URBAN MODELING

The invention was made with Government support under USSOCOM Urban Recon ACTD, contract no. DACA42-03-D-0007 and DARPA UrbanScape, contract no. NBCHC050075. The Government may have certain rights in this invention.

BACKGROUND OF THE INVENTION

1. Field of the Invention

The invention relates generally to the field of terrain modeling and more particularly to a process for time-synchronizing the collection of data from various sensor components.

2. Description of the Related Art

U.S. Pat. No. 4,439,788 assigned to Ball Corporation describes a master clock signal that is used to readout the data produced by a first sensor. A phase-locked loop produces a slaved, pliant, clock signal for reading the data out of a second sensor. By varying the phase, average frequency, and the instantaneous clock frequency along the cross-track axis of the slaved clock signal relative to the master clock signal, compensations are made for the accuracy and coordination of data collection between sensors. This patent is incorporated herein by reference for its teachings.

U.S. Pat. No. 6,937,270 to OmniVision Technologies, Inc. describes a CMOS camera image sensor that may be combined with additional CMOS camera image sensors to form a multiple-camera security monitoring system. Each CMOS image sensor includes phase-locked loop circuitry. The phase-locked loop circuitry receives a reference input signal and in response thereto synchronizes the video output of the CMOS image sensor to the reference input signal. The reference input signal may come from one of the CMOS image sensors or from an external circuit. This patent is incorporated herein by reference for its teachings.

The prior art does not describe a process for time-synchronizing the receipt of data from all sensors at a central processor such that the data from individual sensors can be matched with simultaneously received time and location data without the need for continuous recalculation and application of delay corrections.

BRIEF SUMMARY OF THE PRESENT INVENTION

Summary of the Problem

There is a need in the art for the ability to precisely collect timely information about urban landscapes. More specifically, there is a need in the art for laser-based sensor systems to support on-the-move 3-dimensional (3D) modeling of urban terrain, e.g., cities, from moving ground platforms (such as vehicles, including Unmanned Ground Vehicles (UGVs) and Remotely Operated Vehicles (ROVs) and boats). Such systems would be used to generate precision geo-registered 3D point clouds by exploiting time-synchronized integrated inertial navigation technology. Accordingly, there is a need in the art for a system and process for integrating and synchronizing sensor data, e.g., from Laser Imaging Detection and Ranging (LIDAR) and other systems, with time, location and pose data from the moving ground platform's Interial Navigation System (INS) to support precision mapping requirements.

Summary of the Solution

A Heart Beat System (HBS) enables both inertial navigation system (INS) technology and other sensors, e.g., laser radar (LIDAR) systems, cameras and the like to be precisely time-coupled. The result of this coupling enables microsecond control by the HBS to each sensor slave component. This synchronization enables the precise time of each sensor measurement to be known which in turn allows highly accurate world coordinates to be computed from each set of received data, e.g., laser pulses range data. Such precision can result in 3-dimensional point cloud data with relative accuracies in the 5-10 cm range and absolute positioning accuracies in the sub 40 cm range. This precision further enables multiple sensors to be used simultaneously with outstanding automatic registration which leads to fused 3D point cloud databases representing a more comprehensive urban scene.

In a first exemplary embodiment a process for time-synchronizing receipt of data from a plurality of sensors is described. The process includes: placing the plurality of sensors in a phase-locked loop, such that data collection trigger signals for each of the plurality of sensors occur in a known pattern in relation to one another; disabling the data collection trigger signals to each of the plurality of sensors for a predetermined amount of time; and enabling the data collection trigger signal to each of the plurality of sensors after the predetermined amount of time, wherein a first set and all subsequent sets of data collected from each of the plurality of sensors are synchronized in time.

In a second exemplary embodiment a process for time-synchronizing receipt of data from a plurality of sensors is described. The process includes: placing the plurality of sensors and a master clock in a phase-locked loop, such that data collection trigger signals for each of the plurality of sensors occur in a known pattern in relation to one another and the master clock; disabling the data collection trigger signals for a predetermined amount of time; and enabling the data collection trigger signal to the plurality of sensors after the predetermined amount of time, wherein a first set and all subsequent sets of data collected from each of the plurality of sensors are synchronized in time.

In a third exemplary embodiment a process for time-synchronizing data collection from a plurality of sensors is described. The process includes: enabling trigger signals to each of the plurality of sensors and placing in a phase-locked loop along with a master clock signal; collecting data from each of the plurality of sensors at a processor; disabling the trigger signals to each of the plurality of sensors until a data buffer of the processor is cleared; re-enabling the trigger signals to each of the plurality of sensors in accordance with a leading edge of the master clock signal, such that a first set and all subsequent sets of data collected from each of the plurality of sensors after re-enablement are synchronized in time.

DETAILED DESCRIPTION OF THE PREFERRED EMBODIMENTS OF THE PRESENT INVENTION

Figure 1:
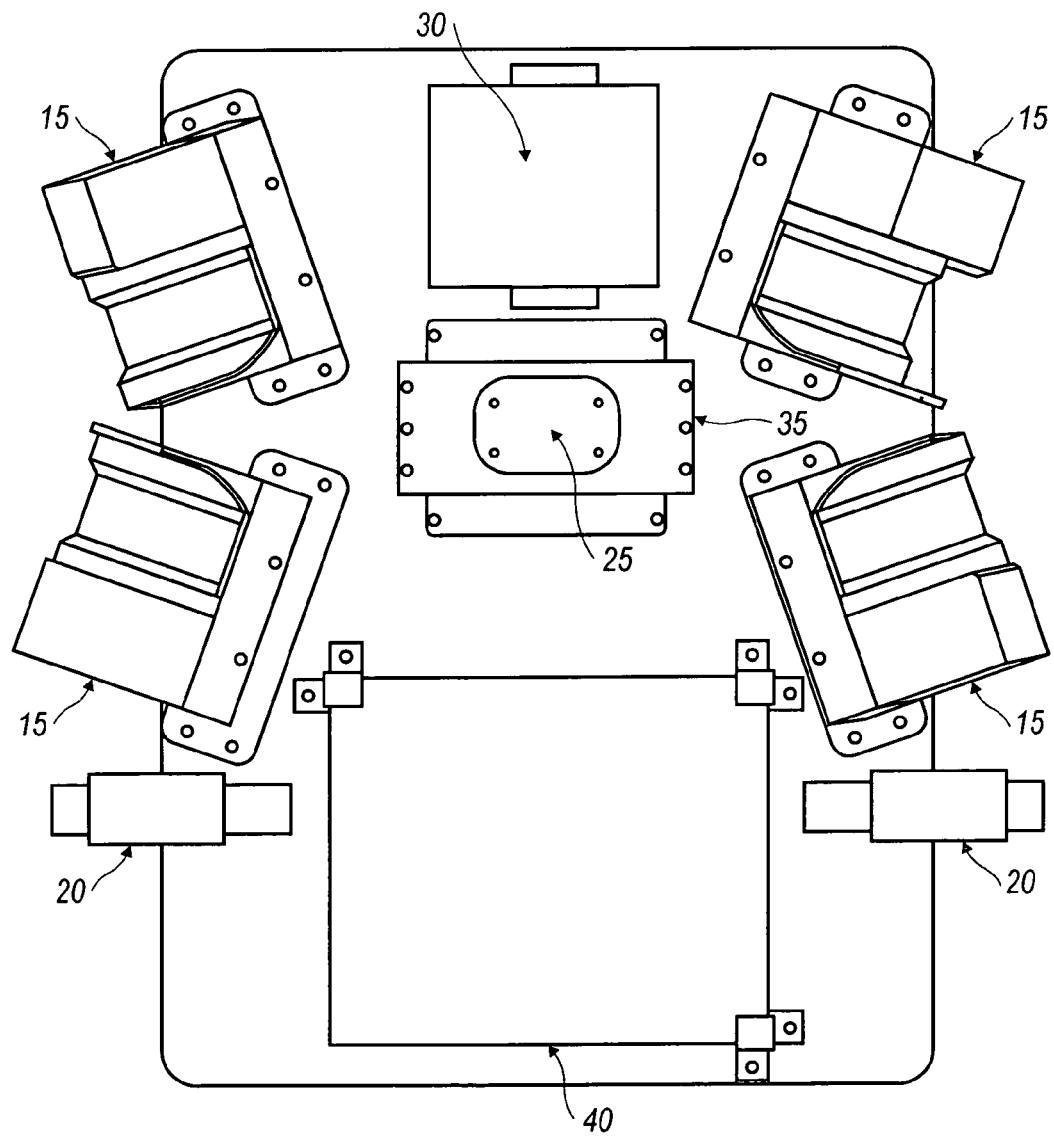
FIG. 1 shows a first view of an exemplary sensor system utilized with the preferred embodiment of the present invention.
Figure 2:
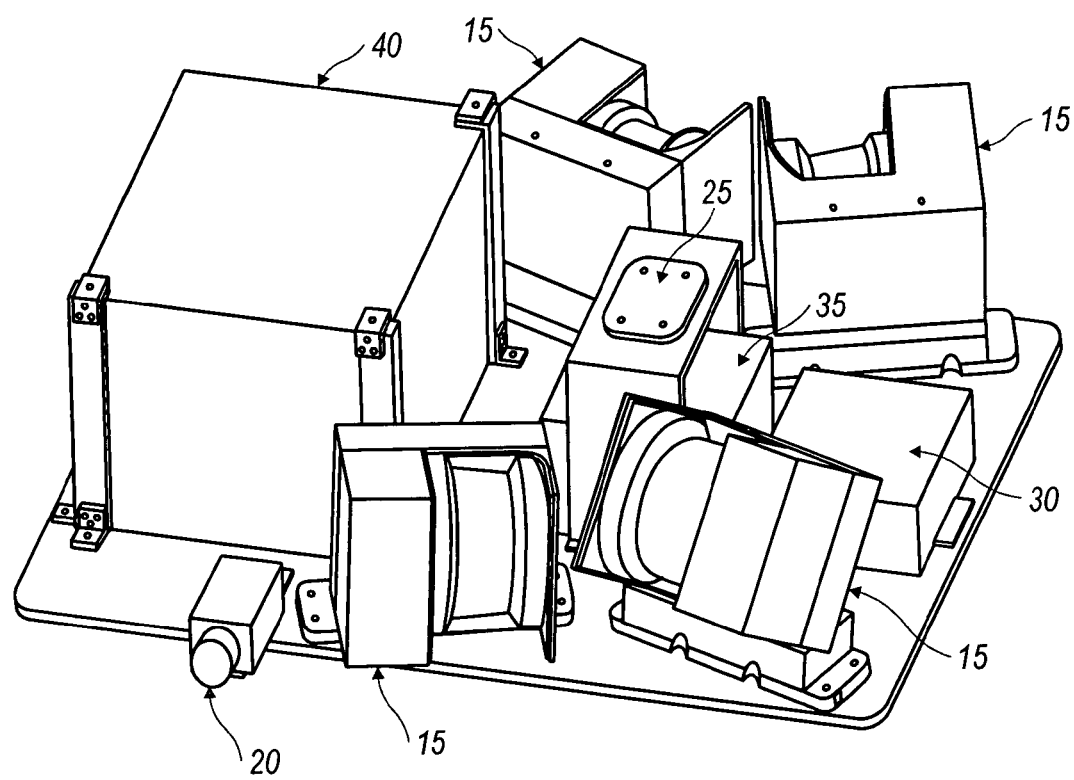
FIG. 2 shows a second view of an exemplary sensor system utilized with the preferred embodiment of the present invention.
Figure 3:
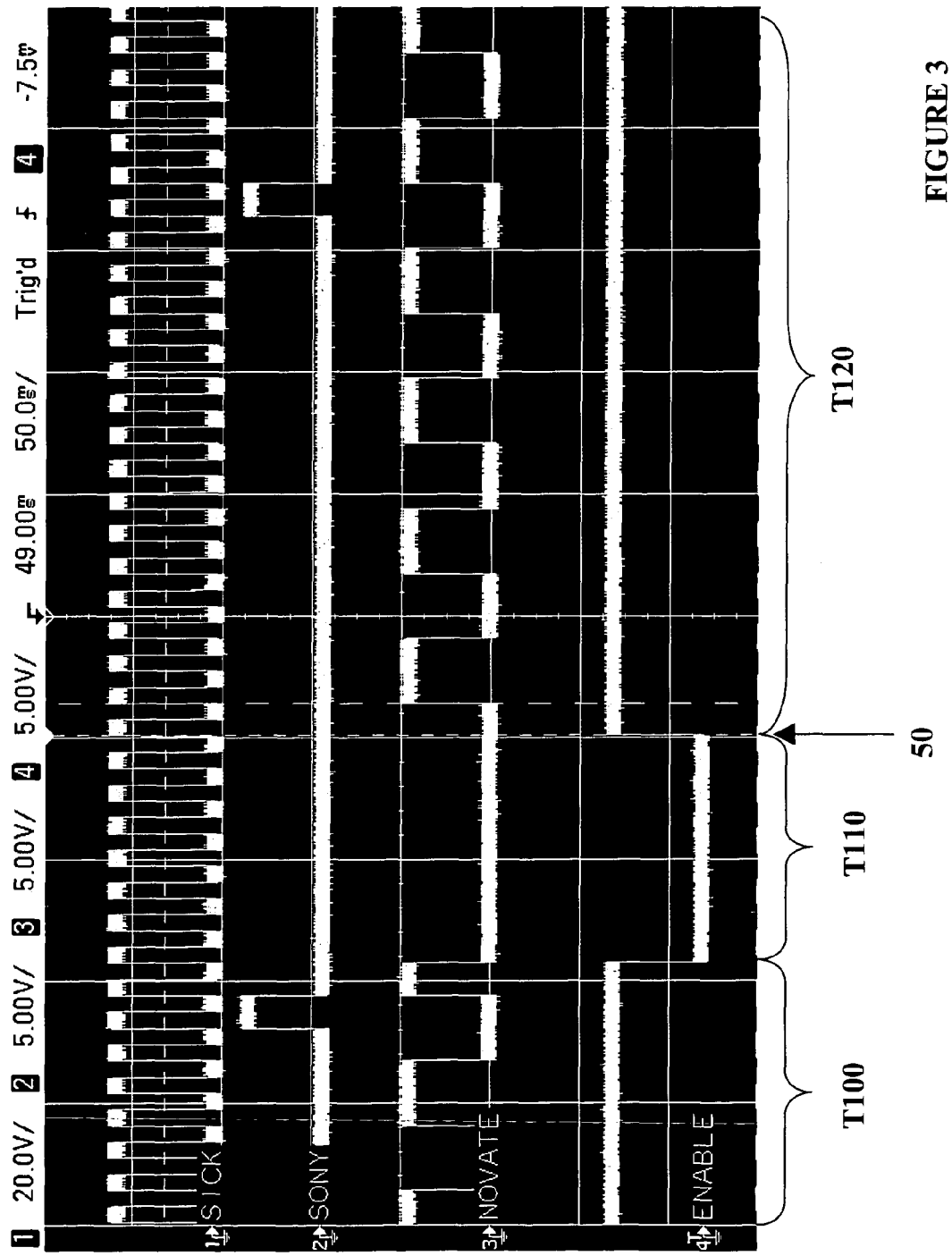
FIG. 3 shows a timing diagram according to a preferred embodiment of the present invention.
Figure 4:
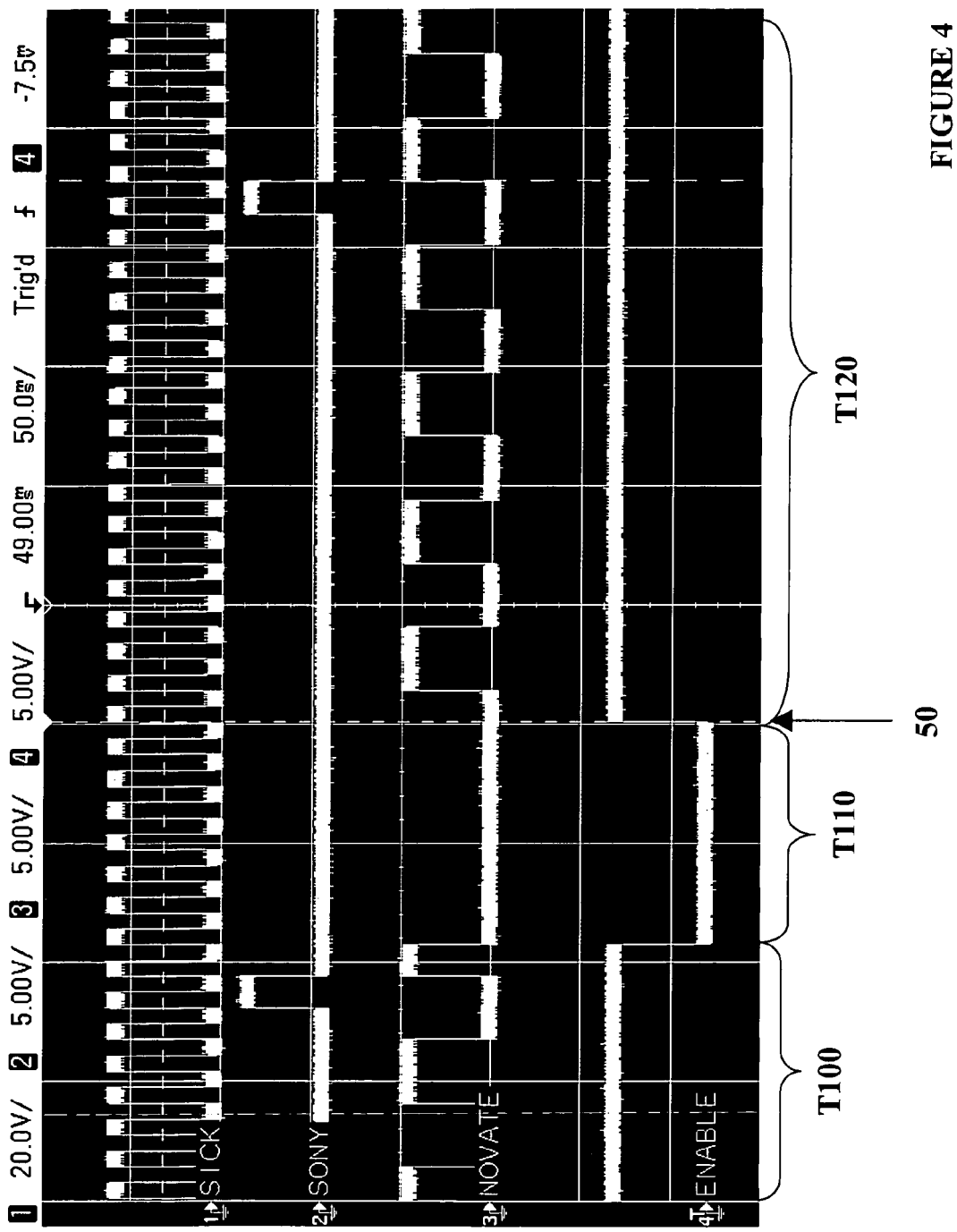
FIG. 4 shows a timing diagram according to a preferred embodiment of the present invention.
Figure 5:
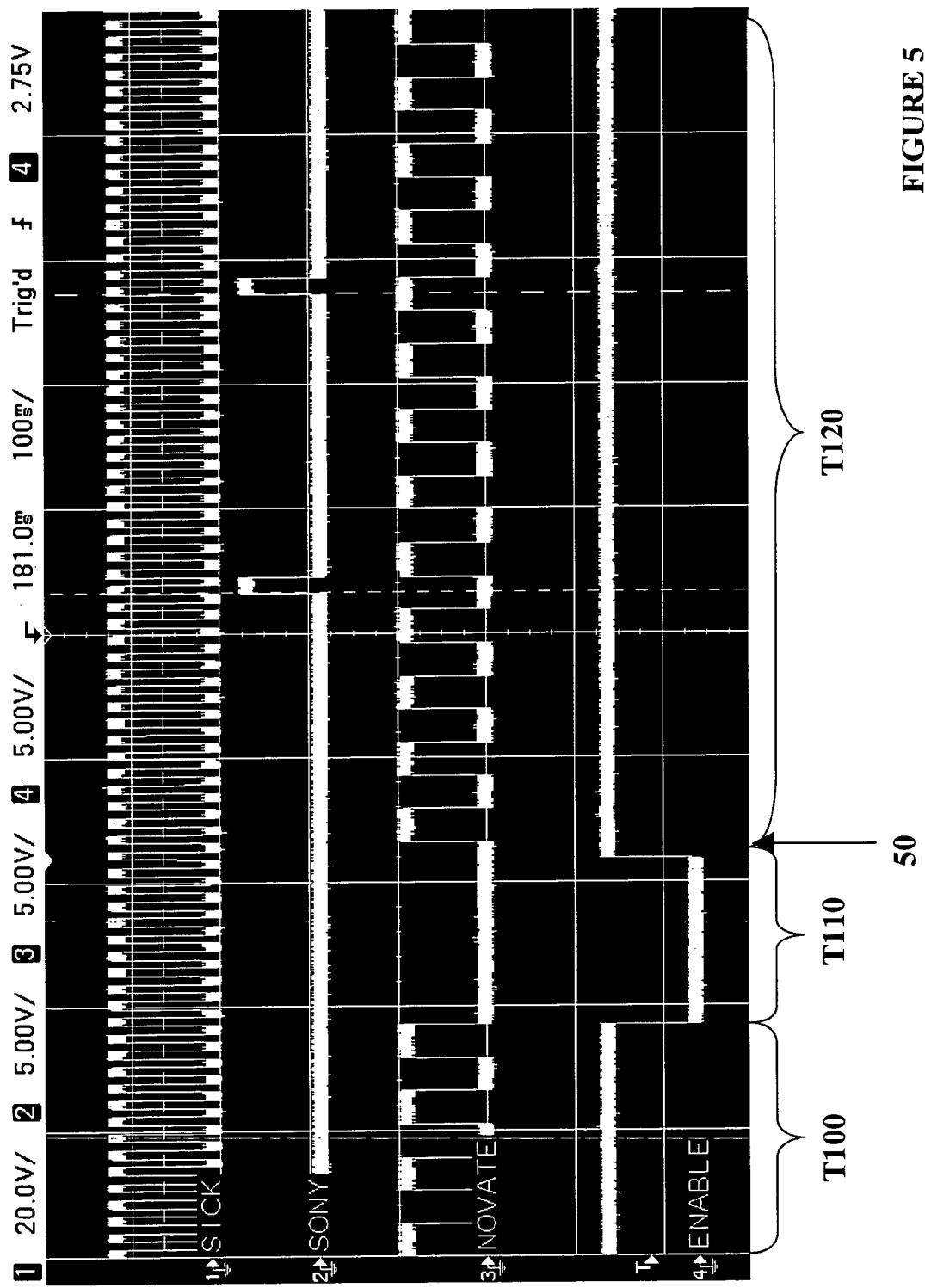
FIG. 5 shows a timing diagram according to a preferred embodiment of the present invention.
Figure 6:
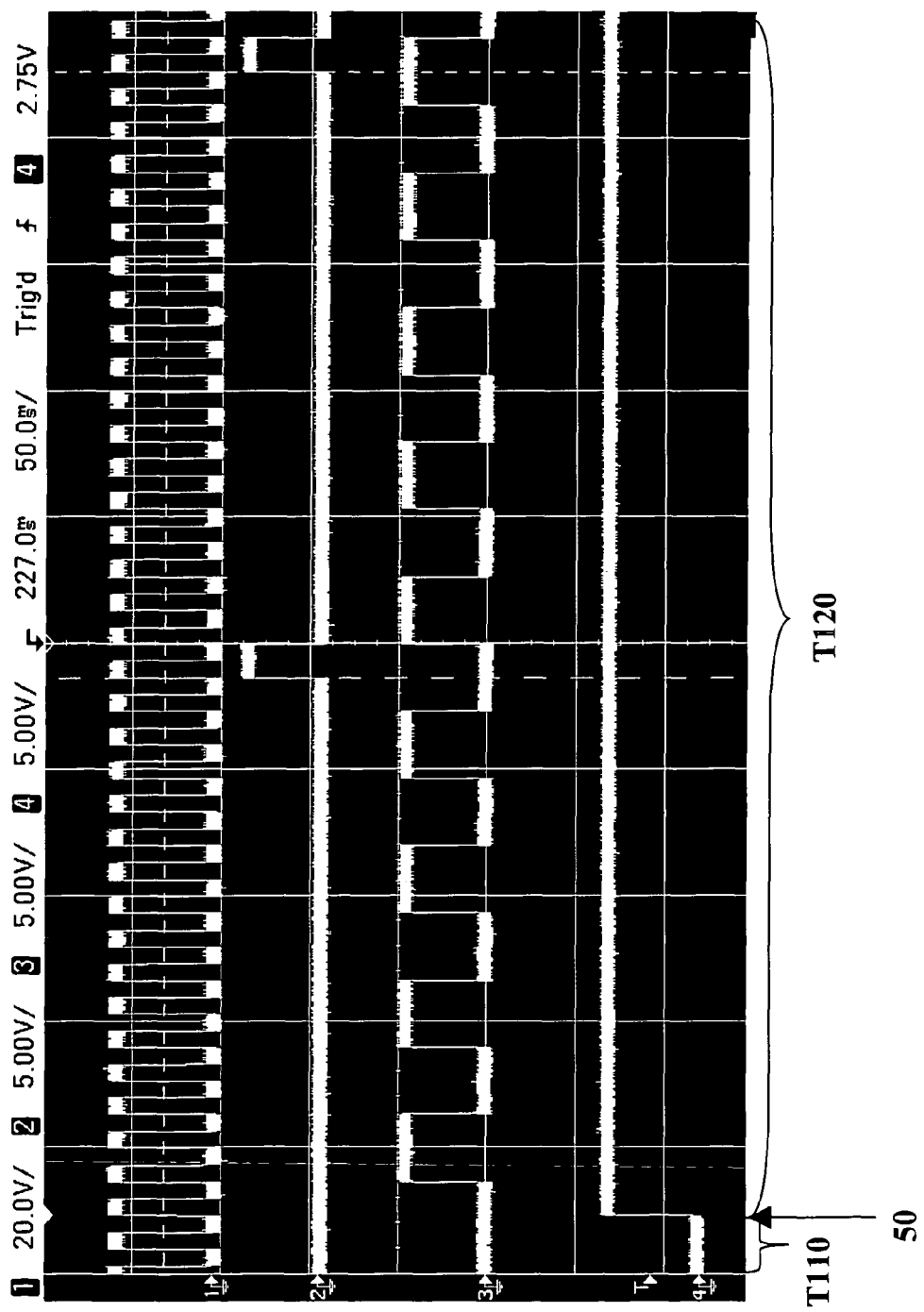
FIG. 6 shows a timing diagram according to a preferred embodiment of the present invention.

For context, the present invention is useful with a ground-based vehicle mounted data collection system. Referring to FIGS. 1 and 2, an exemplary system is shown from a top-view (FIG. 1) and side-view (FIG. 2) and includes the following components: four Laser Imaging Detection and Ranging (LIDAR) systems 15; two still cameras 20; a Global Positioning System (GPS) including an antenna 25 and a receiver 30; an Inertial Measurement Unit (IMU) 35; and a central processing computer (hereafter "processor") 40. For the present invention, the GPS and IMU systems together form an inertial navigation system ("INS"). Alternatively, fewer or additional sensors may be used, such as video cameras, digital still cameras, linescan cameras or the like.

LIDAR is an optical remote sensing technology which measures properties of scattered light to find range and/or other information related to a distant target using laser pulses. The range to an object is determined by measuring the time delay between transmission of the pulse and detection of the signal reflected off of the object (or by measuring phase differences between the transmitted and received light). GPS uses a receiver to collect information from multiple GPS satellites broadcasting precise timing signals by radio. Collection of this data allows the GPS receiver to accurately determine its location (longitude, latitude, and altitude) in any weather, day or night, anywhere on Earth. An IMU is a closed system that is used to detect the pose: roll, pitch and heading of the vehicle or aircraft on which it is installed. The IMU utilizes a combination of accelerometers and angular rate sensors (gyroscopes) to track how the vehicle or aircraft is moving and its pose. Since the IMU is only measuring the movements of the vehicle or aircraft from within the vehicle or aircraft, it is not susceptible to signal jamming or the like, though significant vibration in the platform will introduce noise. The IMU is placed in close proximity to the other sensors and tied down through a solid plate so as to remove errors in the pose estimate of the other sensors. What is critical to know is the sensor's pose and not the IMU's pose. If the sensors are tied down to the IMU then any movement recorded by the IMU will be equivalent to any movement seen by the sensors. By knowing the sensors' pose with respect to the IMU (which can be estimated through static measurements or calibration procedures understood by those skilled in the art) an accurate pose of the sensors can be determined from the pose of the IMU.

The processor 40 collects data from each of the sensors at the direction of a user. The sensors are synchronized via a phase-locked loop which is a closed-loop feedback control system that generates and outputs a signal in relation to the frequency and phase of an input ("reference") signal. A phase-locked loop circuit responds to both the frequency and the phase of the input signals, automatically raising or lowering the frequency of a controlled oscillator until it is matched to the reference in both frequency and phase. While phase-locking the sensors is an important step in synchronizing the sensor data outputs, because the sensors do not pulse at precise, predictable rates, there are other timing discrepancies which cannot be remedied via phase-locking alone.

A preferred embodiment of the present invention is directed to a process for synchronizing data collection from various sensors, e.g., LIDAR, still or video cameras, etc. with a navigational system, i.e., precise time, location and pose data. The system can collect high-resolution relative accuracies in the 5-10 cm range and highly accurate absolute accuracies in the sub 1 meter, e.g., down to 40 cm, 3-dimensional geometry and texture data of surrounding area from a land vehicle passing by at speeds of up to approximately 30-40 mph. In fact, there is no actual speed limitation. Additional sensors will allow for accurate readings at higher speeds, but will also require more precise synchronization. According to the present invention, precision registration is calculated as: distance (meters)=speed (meters/second)*[time of synchronization error (seconds)]. The novel system described herein is referred to as a heart beat system ("HBS") which creates a deterministic or synchronized relationship between newly developed and/or commercial-off-the-shelf (COTS) components, such as INS and LIDAR, which do not pulse at a precise predictable rate. For example, the manufacturer might state that a LIDAR system pulses at 1000 Hz, but in fact the system actually randomly pulses somewhere between 990 and 1010 pulses per second. The nature of the HBS removes the automated pulsing nature of the LIDAR system and provides a triggered event that is deterministic (i.e., time-synchronized). Secondly, because of this master-slave architecture the INS system can be used to request precise, microsecond timing information. This timing information is later used in post-processing to associate precise geo-positioning and attitude of the vehicle for each laser pulse. If one knows the exact geo-position and attitude of the vehicle at each pulse then the laser range data from each pulse can be used to calculate the precise geo-position of each point cloud element. A point cloud is the collection of points in 3D space resulting from scanning an object; the point cloud represents the surface of the object.

To illustrate the problem and state of the prior art in a little more detail, we understand that the end goal is to be able to correlate all data taken from individual sensors at the same time. So, for example, if you have two LIDAR systems, when you turn them both on, they immediately start their individual triggering sequence of pulses, and begin sending data to the processor soon thereafter. The user does not have control over when the LIDAR system triggers or sends data, other than the fact that when the user turns the systems on, the user knows that they will automatically start generating trigger pulses. The LIDAR trigger is difficult to control externally because the laser system uses a high speed rotating mirror. One cannot start the rotation of this mirror with a pulsed trigger. So the mirror has to be rotating at its maximum speed from the time the sensor is turned on. As between the two LIDAR systems, it is possible to force them to be in phase via a phase-lock loop, but even given this information, i.e., two systems in phase, how does the user ensure that the first sequence of the first data that you receive from the first LIDAR system corresponds with the first data from the second LIDAR system when you read both sets of data into the processor? If the two sets of data are from different times, then an accurate, registered picture of the terrain cannot be captured.

The identified problem to be solved by the invention is as follows. The trigger frequency of each such sensor can be expected to vary over a range. The latency between measurement at each such sensor and receipt of the data from each sensor at the processor can vary widely with factors such as buffering at the sensor, and differences in the communications path between each sensor and the processor. To account for these factors, the preferred embodiment of the present invention correlates data from such sensors by: placing a plurality of such sensors in a phase lock control loop; disabling an enablement signal (which controls communication between the sensors and the host processor) to at least one of the phase locked sensors for a time sufficient to clear a data buffer of the processor that received data from the sensor for which the enablement signal has been disabled; and then enabling at least one disabled enablement trigger signal based on a clock; either an independent clock, or one of the sensors serving as a master. As discussed previously with respect to the existing art cited, placing the sensors in a phase lock control loop addresses the frequency differences/variations, but does not provide a reference useful for correlating data returned from the sensors. The inventive concept of toggling an enablement communication signal based on a clock, e.g., a master sensor, provides such a reference.

Referring to FIGS. 3-6, trigger and timing diagrams show the relationship between various exemplary sensors operating within the HBS. In each diagram, signal 1, "SICK" is exemplary of a LIDAR signal (SICK is a company specializing in COTS laser measurement systems); signal 2, "SONY" is exemplary of a still camera signal; signal 3, "NOVATE" is exemplary of the GPS signal (NOVATE is short for COTS products offered by NovAtel, Inc. which collect both GPS and IMU data and formulate a combination thereof, i.e., INS data, for sending to the processor; and signal 4, "ENABLE" is exemplary of the enablement signal, i.e., the signal which indicates when the processor is or is not collecting data from the sensors.

Using the signal 4 ENABLE as the reference signal, when this ENABLE signal is high, e.g., T100, the processor is collecting data; when the ENABLE signal is low T110, data collection and/or data communication between the sensors and the processor is interrupted. In these exemplary diagrams, simultaneous with toggling the ENABLE signal "off" or low, the SONY and NOVATE signals are also interrupted, i.e., they are no longer triggering as a result of the ENABLE signal going low T110. During time T110, the SICK signal continues to trigger and is collecting data at all times although no data is being collected at the processor. Accordingly, no data from any sensor is being communicated to the processor. The processor will be aware that a reset (i.e. ENABLE signal went low) has happened because the processor does not receive any data for an x-seconds duration of time. The enable signal therefore needs to stay low for duration longer than x-seconds. In these exemplary timing diagrams, the SICK signal acts as a master clock, while the SONY and NOVATE signals are slaves. For each leading edge of the SICK signal and the NOVATE signal occurring after T110, data is collected during T120. And for each falling edge of the SONY signal occurring after T110, data is collected during T120. Importantly, the processor and thus the user will know that the first data received from each sensor after toggling the ENABLE signal back "on" corresponds in time to each other.

The above is a particular embodiment illustrating a sensor relationship and data packet synchronization sequence, wherein when the ENABLE signal goes low, one of the sensors, the master clock sensor, continues to trigger, i.e., collect data, but has communication to the processor disabled while the remaining sensors are no longer triggering and consequently not collecting data or communicating with the processor. What is critical to all embodiments is that a reset of the ENABLE signal acts to disable communication with the processor and thus line up the data packets from each sensor up to re-enablement. This can be achieved by stopping the trigger to the sensors (i.e. the sensors do not send anymore data) or interrupting the communication line between the sensors and the processor (i.e. disconnect the serial line, network cable, etc).

The corresponding sequence of events is as follows. Importantly, the sensors and processor are individually controllable by the user. Accordingly, the user powers "on" the sensors, e.g., LIDAR, INS, camera and the processor. At this point, the processor is collecting packets of data from each of the sensors, but there is no way to tell which LIDAR and camera signals correspond to which time, location and pose recorded by the INS. The user next disables the communication between the sensors and the processor, and also disables the triggering of the NOVATE and the SONY. This clears the buffer in the processor of all previously received data packets. The user then re-enables the processor data collection and the NOVATE and SONY signals—as discussed previously, the SICK signal as the master continues to trigger throughout this process. Accordingly, upon re-enablement, the first data from the sensors that comes to the processor buffers corresponds to the first data that was allowed through the system after enablement. The first packet of data from each sensor corresponds to the first leading edge for each sensor (or falling edge for the SONY) after the enablement trigger line 50. Importantly, the rising edge of the ENABLE signal upon re-enablement will always correspond to a leading edge of the SICK signal as the master. This can be accomplished with circuitry, e.g., a D-FlipFlop. As such, all packets are synchronized going forward during data collection.

Referring still to FIGS. 3-6, it is clear from the figures that each of the sensors does not necessarily trigger exactly with the trigger line 50, i.e., the leading edge of the ENABLE signal. The delays are tracked using internal counters (not shown), there are a fixed number of counts, e.g., clock cycles before each trigger. This is configurable. Importantly, once established, every time a user re-enables, there will be the same amount of delay between the time the enable comes high and the time the actual trigger counts high. For a working example, in a system based on a LIDAR master having the highest trigger frequency among the sensors, it may be determined that the INS system first triggers after 5 cycles of the LIDAR sensor "enable" and that the still camera first triggers after 50 cycles, i.e., the INS system operates at $\frac{1}{5}^{th}$ of the frequency of the LIDAR master and that the camera operates at $\frac{1}{50}^{th}$ of the frequency of the LIDAR master. This will be true regardless of when each sensor actually sends its results to a data collection device. By this method, the first camera response will correspond with the $10^{th}$ INS response and the $50^{th}$ LIDAR response. The phase lock loop will allow this reasoning to be applied reliably to subsequent responses; e.g., the data from the $250,000^{th}$ cycle of the LIDAR after enablement will correspond to the data from the $50,000^{th}$ cycle of the INS and the $5,000^{th}$ cycle of the still camera. Further, it is assumed that the data communication between the sensor and the processor does not drop any packets, or if packets are dropped that one can account for lost data. As is known and understood by those skilled in the art, this is usually achieved by using counters on the data packets sent. Importantly, the collection system needs to be fully aware of any dropped data in order to reliably keep track of the synchronization.

This technology is useful, in part, because each sensor has a substantially determinable latency between enablement and triggering (this latency is separate from the latency in delivering the data to a data collection device). Counters, based on an independent clock or on a master sensor (typically the fastest-cycling sensor) can now determine which sensor response correlates to each other sensor response.

One skilled in the art recognizes that the embodiments and figures provided herein are merely exemplary of the invention. For example, although FIGS. 3-6 show signal timing for three sensors, any number of sensors may be synchronized in the fashion described herein, e.g., each sensor shown in FIGS. 1 and 2 is synchronized in an exemplary embodiment, wherein one of the four LIDAR sensors is the master clock, while the remaining three LIDAR sensors are slaves along the INS and still cameras. Additionally, though one of the LIDAR sensors is used as the master clock in the exemplary embodiment, a different sensor could act as the master clock, or, alternatively, a non-sensor clock could be utilized, e.g., a quartz crystal clock. Further still, though the embodiment described herein utilizes the LIDAR sensor, e.g., SICK signal, cycles as the counter for determining spacing between sensor triggers, this counting could be accomplished using a separate hardware counter that triggers on each re-enable ENABLE signal and is read-out separately and compared to the collection data in order to synchronize. An outside counter may be useful where a particular sensor requires a much higher frequency than the SICK sensor. In this case, an oscillator is built that is some factor higher than the highest sensor frequency. The remaining sensor frequencies are met using clock subdividers which are phase locked to the sensors. One skilled in the art recognizes that the design is optimal when one determines the least common multiplier of all sensor frequencies and then utilizes a clock that generates that highest frequency, and through counters this least common multiplier is divided into the remaining frequencies. Other variations to the embodiments described herein known to those skilled in the art are contemplated by this invention and within the scope thereof.

The preferred embodiments described herein are useful to at least the following industries and for at least the listed purposes: Government protection agencies, e.g., Homeland Security, Secret Service, FBI for Security (Facility, Region, Route Planning), Risk Assessment (Movement), Sniper/Counter-Sniper, Rescue/Recovery; Urban Warfare for Intelligence, Surveillance, Reconnaissance, including Mission Planning/Rehearsal and C2/C41SR Data Infusion; Urban Planning and Mapping for Improved Emergency Response, Planning/Zoning, Engineering/Infrastructure Development and Power line mapping; Environmental Monitoring of Waste Sites and Forestry; Insurance for Accident Scene Recording; Gaming and Entertainment; Real Estate and Tourism.

The invention claimed is:

1. A process for time-synchronizing receipt of data from a plurality of sensors comprising:
    placing the plurality of sensors in a phase-locked loop, such that data collection trigger signals for each of the plurality of sensors occur in a known pattern in relation to one another;
    disabling the data collection trigger signals to each of the plurality of sensors for a predetermined amount of time; and
    enabling the data collection trigger signal to each of the plurality of sensors after the predetermined amount of time, wherein a first set and all subsequent sets of data collected from each of the plurality of sensors are synchronized in time.

2. The process according to claim 1, further comprising:
    receiving data from the plurality of sensors at a processor before disabling the data collection trigger signal to each of the plurality of sensors; and
    clearing the received data from the processor in response to disabling the data collection signal to each of the plurality of sensors.

3. The process according to claim 1, the plurality of sensors having different trigger signal frequencies.

4. The process according to claim 3, the sensor having the highest trigger signal frequency being used as a master clock in order to synchronize data collection from the plurality of sensors.

5. The process according to claim 1, the plurality of sensors including at least a laser imaging sensor and time, location and pose sensor.

6. The process according to claim 5, the time and location sensor includes at least a global positioning system.

7. The process according to claim 1, further comprising constructing 3-dimensional point clouds utilizing the time-synchronized data.

8. The process according to claim 7, the 3-dimensional point clouds representing objects sensed in terrain surrounding the plurality of sensors.

9. The process according to claim 8, further comprising representing objects sensed in the terrain to within approximately 5-10 cm relative accuracy and approximately 1 meter absolute accuracy.

10. A process for time-synchronizing receipt of data from a plurality of sensors comprising:
    placing the plurality of sensors and a master clock in a phase-locked loop, such that data collection trigger signals for each of the plurality of sensors occur in a known pattern in relation to one another and the master clock;
    disabling the data collection trigger signals for a predetermined amount of time; and
    enabling the data collection trigger signal to the plurality of sensors after the predetermined amount of time, wherein a first set and all subsequent sets of data collected from each of the plurality of sensors are synchronized in time.

11. The process according to claim 10, further comprising:
    receiving data from the plurality of sensors at a processor before disabling the data collection trigger signals to each of the plurality of sensors; and
    clearing the received data from the processor in response to disabling the data collection signals to each of the plurality of sensors.

12. The process according to claim 10, the plurality of sensors having different trigger signal frequencies.

13. The process according to claim 12, the master clock having a continuously enabled signal at a frequency that is higher than any trigger signal frequency of each of the plurality of sensors.

14. The process according to claim 10, the plurality of sensors including at least a laser imaging sensor and time, location, and pose sensor.

15. The process according to claim 14, the time and location sensor includes at least a global positioning system.

16. The process according to claim 10, further comprising constructing 3-dimensional point clouds utilizing the time-synchronized data.

17. The process according to claim 16, the 3-dimensional point clouds representing objects sensed in terrain surrounding the plurality of sensors.

18. The process according to claim 17, further comprising representing objects sensed in the terrain to within approximately 5-10 cm relative accuracy and approximately 1 meter absolute accuracy.

19. A process for time-synchronizing data collection from a plurality of sensors comprising:

enabling trigger signals to each of the plurality of sensors and placing in a phase-locked loop along with a master clock signal;

collecting data from each of the plurality of sensors at a processor;

disabling the trigger signals to each of the plurality of sensors until a data buffer of the processor is cleared;

re-enabling the trigger signals to each of the plurality of sensors in accordance with a leading edge of the master clock signal, such that a first set and all subsequent sets of data collected from each of the plurality of sensors after re-enablement are synchronized in time.

20. The process according to claim 19, the plurality of sensors having different trigger signal frequencies.

21. The process according to claim 20, the master clock signal being continuously enabled at a frequency that is higher than any trigger signal frequency of each of the plurality of sensors.

22. The process according to claim 19, the plurality of sensors including at least a laser imaging sensor and time, location, and pose sensor.

23. The process according to claim 22, the time and location sensor includes at least a global positioning system.

24. The process according to claim 19, further comprising constructing 3-dimensional point clouds utilizing the time-synchronized data.

25. The process according to claim 24, the 3-dimensional point clouds representing objects sensed in terrain surrounding the plurality of sensors.

26. The process according to claim 25, further comprising representing objects sensed in the terrain to within approximately 5-10 cm relative accuracy and approximately 1 meter absolute accuracy.

* * * * *